(12) United States Patent
Desborough

(10) Patent No.: US 8,392,105 B2
(45) Date of Patent: Mar. 5, 2013

(54) METHOD, SYSTEM, AND APPARATUS FOR OPERATING A VEHICLE

(75) Inventor: Lane David Desborough, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 12/683,805

(22) Filed: Jan. 7, 2010

(65) Prior Publication Data
US 2011/0166740 A1   Jul. 7, 2011

(51) Int. Cl.
*G08G 1/16* (2006.01)

(52) U.S. Cl. ............. 701/301; 701/3; 701/54; 701/31.5; 701/33.4; 340/425.5; 340/438; 340/439; 340/505; 340/903; 702/183; 702/188; 180/65.1; 180/65.25; 180/68.5; 188/371; 188/377; 60/650; 60/659; 60/682

(58) Field of Classification Search ............. 701/3, 31.5, 701/54, 301, 33, 33.4; 340/425.5, 438, 439, 340/5.64, 5.72, 903, 905; 702/183, 188; 180/65.1, 65.25, 68.5; 60/659, 650, 682; 296/187.03, 187.09; 188/371, 377; 280/749, 280/784; 903/905, 916; 293/133; 267/139; 256/13.1; 404/6
See application file for complete search history.

(56) References Cited

U.S. PATENT DOCUMENTS

| | | | |
|---|---|---|---|
| 4,945,353 A * | 7/1990 | Jones | 340/10.42 |
| 5,070,959 A * | 12/1991 | Grabowski | 180/167 |
| 5,394,333 A | 2/1995 | Kao | |
| 5,627,752 A | 5/1997 | Buck et al. | |
| 5,778,326 A | 7/1998 | Moroto et al. | |
| 5,838,562 A * | 11/1998 | Gudat et al. | 701/23 |
| 5,956,250 A * | 9/1999 | Gudat et al. | 701/26 |
| 6,155,365 A | 12/2000 | Boberg | |
| 6,169,938 B1 * | 1/2001 | Hartsell, Jr. | 700/302 |
| 6,225,898 B1 * | 5/2001 | Kamiya et al. | 340/505 |
| 6,230,496 B1 | 5/2001 | Hofmann et al. | |
| 6,314,347 B1 | 11/2001 | Kuroda et al. | |
| 6,636,787 B2 | 10/2003 | Yamaguchi et al. | |
| 6,708,090 B2 * | 3/2004 | Staggs | 701/3 |
| 7,013,205 B1 | 3/2006 | Hafner et al. | |
| 7,019,496 B1 | 3/2006 | Garretson | |
| 7,054,593 B2 * | 5/2006 | de La Chapelle et al. | 455/13.4 |
| 7,136,621 B2 * | 11/2006 | de La Chapelle et al. | 455/13.2 |
| 7,317,987 B2 * | 1/2008 | Nahla | 701/301 |
| 7,360,615 B2 | 4/2008 | Salman et al. | |

(Continued)

FOREIGN PATENT DOCUMENTS

| | | |
|---|---|---|
| DE | 10226143 B4 | 1/2004 |
| EP | 1256476 A2 | 11/2002 |

(Continued)

OTHER PUBLICATIONS

An EP International Search Report, dated May 18, 2011, for co-pending International Application No. 10196516.8 (7 pages).

*Primary Examiner* — McDieunel Marc
(74) *Attorney, Agent, or Firm* — Global Patent Operation

(57) ABSTRACT

Operating a vehicle includes receiving, by a central controller, positional data related to the vehicle and environmental data related to a current route of the vehicle. The central controller calculates a desired energy allocation based on the positional data and the environmental data, and transmits the desired energy allocation to the vehicle for use in controlling engine function.

7 Claims, 3 Drawing Sheets

U.S. PATENT DOCUMENTS

| | | |
|---|---|---|
| 7,392,871 B2 | 7/2008 | Severinsky et al. |
| 7,630,683 B2 * | 12/2009 | de La Chapelle ............ 455/13.2 |
| 8,068,951 B2 * | 11/2011 | Chen et al. ................... 701/31.4 |
| 2002/0188387 A1 * | 12/2002 | Woestman et al. ............. 701/22 |
| 2004/0059504 A1 * | 3/2004 | Gray ............................. 701/301 |
| 2006/0106506 A1 * | 5/2006 | Nichols et al. .................... 701/3 |
| 2011/0050424 A1 * | 3/2011 | Cova et al. ................. 340/572.1 |

FOREIGN PATENT DOCUMENTS

WO 2009126554 A1 10/2009

* cited by examiner

METHOD, SYSTEM, AND APPARATUS FOR OPERATING A VEHICLE

BACKGROUND

The embodiments described herein relate generally to vehicles and, more particularly, to methods, systems, and apparatus for use in controlling energy consumption, emissions reduction, and/or sound reduction for hybrid vehicles.

At least some known hybrid vehicles use a control system that includes embedded logic that is programmed to alter the storage and/or the consumption of energy based on general usage statistics gathered during test cycles. Specifically, at least some known hybrid vehicle control systems include embedded algorithms that optimize energy use across a generalized and/or broad range of driving conditions, such as conditions that are prevalent on test tracks, in regions and/or countries where the vehicles are operated, and the like. However, known algorithms do not use real-time or near real-time location and/or condition information to optimize energy use. As a result, at least some known hybrid vehicles do not achieve the same fuel efficiency under normal operating conditions as is observed during test track operation.

BRIEF DESCRIPTION

In one aspect, a method is provided for operating a vehicle. The method includes receiving, by a central controller, positional data related to the vehicle and environmental data related to a current route of the vehicle. The method also includes using the central controller to calculate a desired energy allocation based on the positional data and the environmental data, and transmitting the desired energy allocation to the vehicle for use in controlling engine function.

In another aspect, a system is provided for use in operating a vehicle. The system includes a communication transponder configured to be coupled to an engine control system within the vehicle, and to determine coordinates of the vehicle. The system also includes a central controller that is configured to communicate with the communication transponder, wherein the processor is configured to receive position messages from the communication transponder that include coordinates of the vehicle as determined by the communication transponder. The central controller is also configured to determine a current route of travel of the vehicle, receive terrain data related to the current route, calculate a desired energy allocation for use by the engine control system, and transmit the desired energy allocation to the communication transponder, such that the engine control system controls engine function of the vehicle based on the desired energy allocation.

In another aspect, a controller is provided for use in determining a desired energy allocation by a vehicle. The controller includes a memory configured to store at least one previous route of travel by the vehicle, and a processor coupled to the memory. The processor is configured to receive location data from the vehicle, determine a current route based on the location data and the previous route, receive environmental data, calculate the desired energy allocation based on the current route and the environmental data, and transmit the desired energy allocation to the vehicle for use in controlling engine function.

BRIEF DESCRIPTION OF THE DRAWINGS

The embodiments described herein may be better understood by referring to the following description in conjunction with the accompanying drawings.

DETAILED DESCRIPTION

Described herein are exemplary embodiments of methods, systems, and apparatus that facilitate allocating energy in vehicles, such as hybrid vehicles, electric vehicles, and/or any other suitable vehicle, based on real-time, or nearly real-time, environmental and driving factors. Optimizing energy allocation in accordance with the present invention facilitates increasing fuel economy for operators and/or enables information related to driving patterns and behaviors to be obtained. Increasing fuel economy facilitates decreasing an amount of fuel purchases that are required by the operator, while obtaining information related to driving patterns and behaviors facilitates improving subsequent vehicle designs, and/or decreasing insurance premiums based on usage-based premiums and/or behavior-based premiums. Traffic patterns may be measured and/or optimized. Moreover, obtaining such information facilitates notifying emergency services of traffic accidents, locating vehicles in the event of a theft, and/or providing recommendations, such as a driving speed that enhance fuel economy and/or fueling locations in case of a low fuel alert.

Exemplary technical effects of the methods, systems, and apparatus described herein include at least one of: (a) receiving, by a central controller, positional data related to a position of a hybrid vehicle, including latitude coordinates and/or longitude coordinates, and an altitude of the hybrid vehicle; (b) receiving energy usage data from the hybrid vehicle, including fuel efficiency, average speed, and/or average acceleration; (c) determining, using the central controller, a current route of the hybrid vehicle based on the positional data and/or on previous routes stored in a memory; (d) receiving, by the central controller, environmental data related to the current route of the hybrid vehicle, including weather data, traffic data, and/or terrain data; (e) calculating a desired energy allocation for use by the hybrid vehicle based on the current or predicted route, the altitude, and/or the environmental data; and (f) controlling, by the hybrid vehicle, engine function based on the desired energy allocation to optimize fuel efficiency and/or an amount of stored energy.

Figure 1:
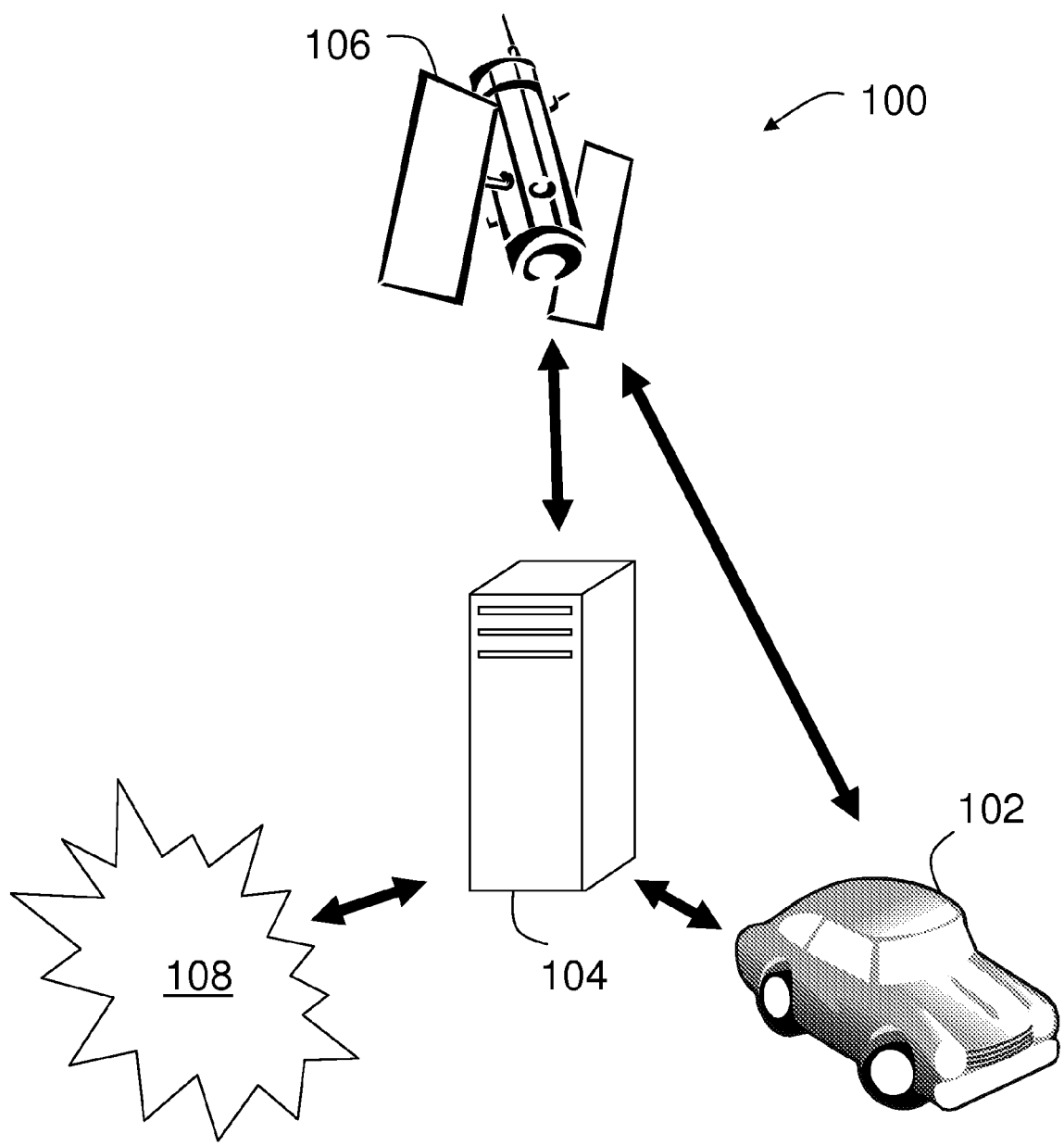
FIG. 1 is a high-level schematic view of an exemplary system that may be used to control energy consumption and/or energy generation in a vehicle.

FIG. 1 is a high-level schematic view of an exemplary system 100 for use in controlling energy consumption and/or energy generation in a hybrid vehicle 102. In the exemplary embodiment, system 100 also includes at least one central controller 104 and a plurality of geo-positioning satellites 106, such as Global Positioning System (GPS) satellites. In an alternative embodiment, system 100 includes a plurality of terrestrial elements, such as cellular network nodes.

Moreover, in the exemplary embodiment, hybrid vehicle 102 includes an engine control system that is coupled to a transponder (neither shown in FIG. 1). The engine control system monitors and controls operating aspects of multiple powertrains used to propel hybrid vehicle 102, including a fuel powertrain and a hybrid powertrain (neither shown). More specifically, the engine control system regulates a fuel engine and one or more electric motors (none shown) as necessary to ensure energy demands introduced by internal operating factors and/or external operating factors are satisfied. Such internal operating factors may include, but are not limited to only including, gear shift position, accelerator use, and/or vehicle speed. Such external operating factors may include, but are not limited to only including, weather conditions, traffic conditions, terrain conditions, and/or an altitude at which hybrid vehicle 102 is operated. The engine control system also controls operation of an inverter and convertor (neither shown) that balance power requirements of hybrid vehicle 102. More specifically, and in the exemplary embodiment, the engine control system controls use of the fuel powertrain and the hybrid powertrain to facilitate optimizing energy usage and/or energy balance such that hybrid vehicle 102 generates new electrical energy for storage during optimal time periods and uses stored electrical energy during other optimal time periods, as described in more detail below.

The transponder communicates with satellites 108 and/or any suitable terrestrial communication network to determine a position of hybrid vehicle 102 in three dimensions, i.e., latitude, longitude, and altitude. More specifically, in the exemplary embodiment, the transponder receives messages from satellites 108, and determines a time transmitted for each message. Based on the time transmitted for each message received, the transponder calculates a distance between the transponder and each satellite 108 from which a message was sent. The transponder uses a triangulation technique to determine a position of hybrid vehicle 102. In an alternative embodiment, the transponder receives position data from a plurality of nodes within a terrestrial cellular network, and uses a triangulation technique to determine the position of hybrid vehicle 102. The transponder then transmits the position of hybrid vehicle 102 to controller 104 via, for example, wireless communication.

In addition to receiving the position of hybrid vehicle 102, controller 104 also receives a plurality of additional data elements via, for example, the Internet 108. More specifically, controller 104 queries known databases, Internet web sites, and/or other suitable data sources (none shown) for environmental data such as, but not limited to, road conditions, weather data, traffic data, terrain data, traffic light current and/or future states, and/or any other suitable external operating factors. As explained in more detail below, controller 104 calculates a desired energy allocation for use by the engine control system to facilitate controlling the engine function of hybrid vehicle 102.

Figure 2:
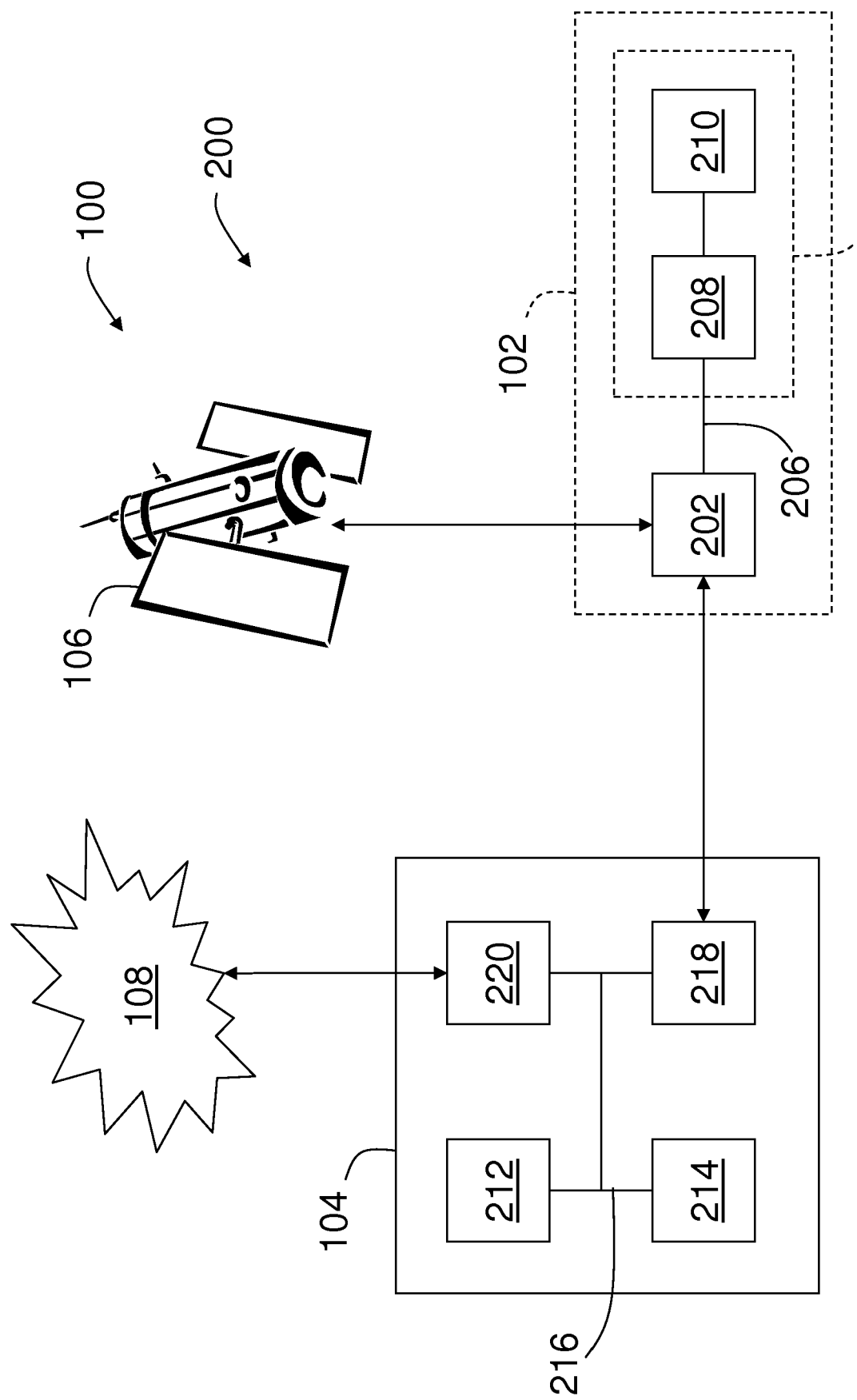
FIG. 2 is a schematic block diagram of an exemplary electrical architecture of the system shown in FIG. 1.

FIG. 2 is a schematic block diagram of an exemplary electrical architecture 200 of system 100. In the exemplary embodiment, hybrid vehicle 102 includes an engine control system 204 that is coupled to a transponder 202, such as a GPS transponder or cellular transponder, via an internal network 206. Internal network 206 may be embodied as a serial network, a fiber optic network, a computer bus, and/or any other suitable network that enables communication between transponder 202 and engine control system 204. In some embodiments, transponder 202 communicates with a plurality of GPS satellites 106 to determine a position of hybrid vehicle 102. In an alternative embodiment, transponder 202 communicates with a terrestrial cellular network to determine the position of hybrid vehicle 102. Moreover, in some embodiments, transponder 202 stores data, such as positional data, that includes latitude and longitude coordinates and includes altitude data, previously traveled routes as defined by a navigational system (not shown), energy usage data, that includes fuel economy data, acceleration data, and/or any other suitable or relevant data. In the exemplary embodiment, engine control system 204 includes a processor 208 and a memory 210 coupled to processor 208. Memory 210 stores data, such as positional data, that includes GPS coordinates and includes altitude data. Moreover, memory 210 stores data such as previously traveled routes, as defined by a navigational system (not shown). Furthermore, memory 210 stores data, such as energy usage data, that includes fuel economy data, acceleration data, and/or any other suitable or relevant data. It should be understood that engine control system 204 may include multiple processors 208 and/or multiple memory areas 210. In an alternative embodiment, memory 210 is not included in engine control system 204 but, rather, is embedded within the electronics of hybrid vehicle 102. In an alternative embodiment, hybrid vehicle 102 also includes a wireless transmitter (not shown) that enables communication of the position of hybrid vehicle 102 to central controller 104. In some embodiments, the wireless transmitter also transmits previously traveled routes and/or energy usage data to controller 104.

In the exemplary embodiment, controller 104 includes a processor 212 and a memory 214 coupled to processor 212 via a system bus 216. It should be understood that controller 104 may include multiple processors 212 and/or multiple memory areas 214. Moreover, in the exemplary embodiment, controller 104 includes a transponder interface 218 that is coupled to processor 212 and to memory 214 via system bus 216. Transponder interface 218 wirelessly communicates with transponder 202 via a wireless protocol such as, but not limited to, wireless access protocol (WAP), WAP Binary XML (WBXML), wireless markup language (WML), or Extensible Hypertext Markup Language Mobile Profile (XHTML MP). In addition, transponder interface 218 wirelessly communicates using a physical layer communication protocol such as, but not limited to, Code Division Multiple Access (CDMA), Time Division Multiple Access (TDMA), microwaves, International Mobile Telecommunications-2000 (3G), 802.11n, and the like. However, any suitable wireless communication protocol may be used to enable communication between transponder 202 and transponder interface 218. In the exemplary embodiment, controller 104 also includes a network interface 220 that is coupled to processor 212 and memory 214 via system bus 216. Network interface 220 enables communication between controller 104 and the Internet 108 using any suitable communication protocol.

Figure 3:
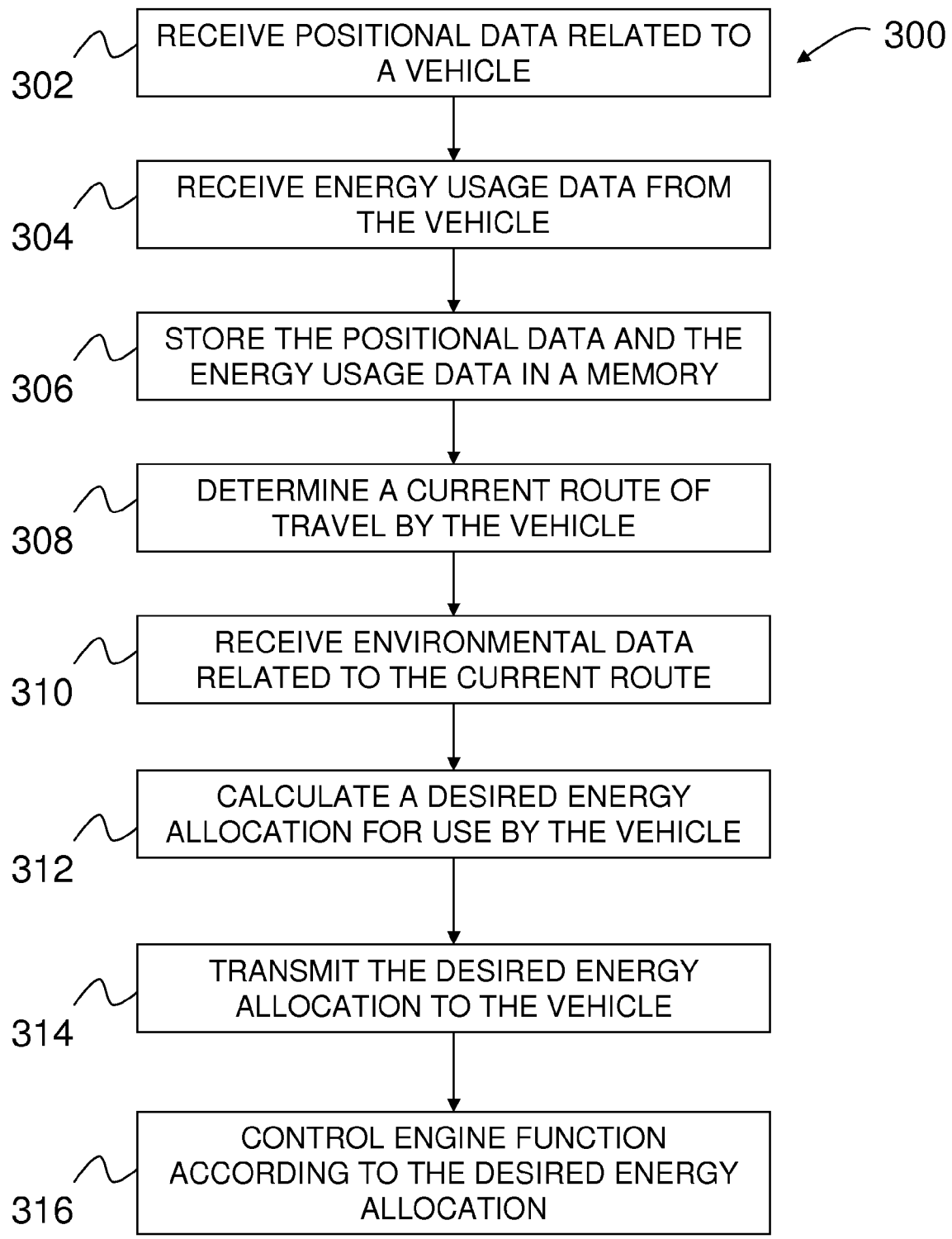
FIG. 3 is a flowchart that illustrates an exemplary method for controlling energy consumption in a vehicle using the system shown in FIGS. 1 and 2.

FIG. 3 is a flowchart 300 that illustrates an exemplary method for controlling energy consumption in a hybrid vehicle, such as hybrid vehicle 102 (shown in FIGS. 1 and 2). Referring to FIG. 2, and in the exemplary embodiment, central controller 104 receives 302 positional data related to a position of hybrid vehicle 102. Specifically, transponder 202 determines, such as on a periodic basis, a position of hybrid vehicle 102 using a triangulation analysis. The triangulation analysis may relate to GPS messages received from GPS satellites 106, or to messages received from a terrestrial cellular network. The positional data includes latitude and longitude coordinates and data indicative of the altitude of hybrid vehicle 102. Controller 104 receives the positional data at a predetermined frequency, such as every minute. Transponder 202 transmits the positional data to transponder interface 218 via a wireless communication protocol. In an alternative embodiment, hybrid vehicle 102 includes a wireless transmitter that transmits the positional data to transponder interface 218.

Moreover, in the exemplary embodiment, controller 104 also receives 304 energy usage data from hybrid vehicle 102. More specifically, processor 208 transmits energy usage data to transponder interface 218 via transponder 202, including fuel economy data, such as, but not limited to, the number of miles per gallon of fuel, an average or mean acceleration, and/or any other suitable data. In the exemplary embodiment, controller 104 stores 306 the positional data and energy usage data in memory 214. Specifically, each message received by controller 104 includes a unique hybrid vehicle identifier. Processor 212 determines the hybrid vehicle identifier from the message, stores each message in memory 214, and associates each message with the hybrid vehicle identifier. Moreover, memory 214 stores previous routes for hybrid vehicle 102, wherein each previous route includes positional data such as latitude and longitude coordinates and altitude.

In the exemplary embodiment, controller 104 determines 308 a current route of hybrid vehicle 102 based on the positional data. More specifically, processor 212 compares the positional data received from transponder 202 to latitude and longitude coordinates, or any other suitable positional coordinates, which are stored and are associated with previous routes for hybrid vehicle 102. In some embodiments, processor 212 compares the positional data received from communication transponder 202 to stored GPS coordinates that are associated with other hybrid vehicles 102 for use in determining traffic data and/or traffic congestion data. In the exemplary embodiment, processor 212 compares the current route with previous routes stored in memory 214. If the current route matches a previous route, processor 212 identifies the previous route as the current route. If the current route does not match a previous route, processor 212 continues to store each successive positional data message in memory 214 and associates the data with a newly saved route. In an alternative embodiment, processor 212 assigns a probability to each of a number of possible routes, and determines a most probable route using, for example, a probabilistic optimization algorithm.

After controller 104 determines the current route of hybrid vehicle 102, controller 104 receives 310 environmental data related to the current route. As described above, the environmental data may include weather data, traffic data, and/or terrain data. Examples of weather data include, but are not limited to only including, wind data such as an average wind speed or wind gust speed, temperature data, and/or precipitation data, such as a barometric pressure, a probability of future precipitation, and/or an amount of post past precipitation. Examples of traffic data include, but are not limited to only including, an average vehicle speed along a given distance and/or an average time of travel between two points. Additional examples of traffic data include upcoming turns and/or hills along the current route, known speed limits along the current route, a time of day, and/or known school zone restrictions along the current route. Examples of terrain data include, but are not limited to only including, a pitch or steepness of road between two points. It should be noted that the above examples are exemplary only and are not meant to limit the types or values of weather data, traffic data, and/or terrain data that maybe used as described herein.

In the exemplary embodiment, controller 104 calculates 312 a desired energy allocation for use by engine control system 204. Specifically, processor 212 calculates the desired energy allocation based on the current route of hybrid vehicle 102, the altitude of hybrid vehicle 102, the environmental data, and/or the energy usage data. Controller 104 then transmits 314 the desired energy allocation to hybrid vehicle 102. Specifically, processor 212 transmits the desired energy allocation to transponder 202. Transponder 202 receives and communicates the desired energy allocation to processor 208. In some embodiments, processor 212 calculates a plurality of desired energy allocations based on different combinations of the current route of hybrid vehicle 102, the altitude of hybrid vehicle 102, the environmental data, and/or the energy usage data. In such embodiments, processor 212 determines a preferred energy allocation based on a probable fuel economy and/or any other desired metric and transmits 314 the preferred energy allocation to hybrid vehicle 102. In another embodiment, engine control system 204 uses known or estimated lifetime values for one or more engine components (not shown), and determines a preferred energy allocation based on such values instead of, or in addition to, a desired fuel economy.

In the exemplary embodiment, engine control system 204 controls 316 engine function based on the desired energy allocation. For example, engine control system 204 may charge one or more batteries (not shown) and use the fuel powertrain for propulsion while travelling uphill to create an energy reserve. In another example, engine control system 204 uses the hybrid powertrain for propulsion and also charges the one or more batteries via brake regeneration while travelling downhill.

Furthermore, in the exemplary embodiment, controller 104 determines a new route, such as an alternative route, for hybrid vehicle 102 that enables a more optimal energy allocation. In such an embodiment, controller 104 determines a new route based at least in part on the current route and the environmental data. For example, if controller 104 receives traffic data that indicates an increased travel time between a present position of hybrid vehicle 102 and a destination point, controller 104 determines a new route based on previous routes used by hybrid vehicle 102 and/or other hybrid vehicles 102 that facilitate reducing the travel time. Moreover, controller 104 calculates a new desired energy allocation based on the new route, and transmits the new desired energy allocation and the new route to hybrid vehicle 102. In an alternative embodiment, controller 104 determines a new route, such as an alternative route, for hybrid vehicle 102 that is more cost effective for the user or operator in terms of fuel costs, time costs, and/or in terms of wear on components of hybrid vehicle 102. For example, engine control system 204 presents the operator with a first route that is associated with a first time and/or a first fuel cost, and a second route that is associated with a second time and/or a second fuel cost. The operator may choose to use the second route based on a more advantageous time and/or cost. Moreover, in some embodiments, controller 104 determines one or more new routes that each includes a driver-specified end point to enhance energy consumption. For example, such routes may include additional mileage around traffic, or may include adjacent obstacles to environmental concerns, such as a headwind.

In some embodiments, the term "hybrid vehicle" refers generally to a vehicle that includes more than one source of energy, such as one or more electric motors that are used to provide propulsion to the vehicle. Energy used to propel electric vehicles may come from various sources, such as, but not limited to, an on-board rechargeable battery, and/or an on-board fuel cell. In one embodiment, the hybrid vehicle is a hybrid electric vehicle that captures and stores energy generated by braking. Moreover, a hybrid electric vehicle uses energy stored in an electrical source, such as a battery, to continue operating when at rest to conserve fuel. Some hybrid electric vehicles are capable of recharging the battery by plugging into a power receptacle, such as a general power outlet. Such vehicles include, without limitation, automobiles, trucks, buses, locomotives, and/or motorcycles. The above examples are exemplary only, and thus are not intended to limit in any way the definition and/or meaning of the term "hybrid vehicle."

In some embodiments, the term "processor" refers generally to any programmable system including systems and microcontrollers, reduced instruction set circuits (RISC), applications specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In some embodiments, the term "controller" refers generally to any device or apparatus for use in a computing environment including a server, a workstation, a personal computer, a laptop computer, a personal digital assistant (PDA), a mobile phone or smartphone, or any other suitable device or apparatus. The above examples are exemplary only, and thus are not intended to limit in any way the definition and/or meaning of the term "controller."

Exemplary embodiments of apparatus, systems, methods, and computer-readable storage media for allocating energy in vehicles, such as hybrid vehicles, electric vehicles, and/or any other suitable vehicle, based on real-time, or nearly real-time, environmental and driving factors are described above in detail. The apparatus, systems, methods, and storage media are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Moreover, the order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention. Similarly, execution or performance of the above-described operations may be performed by any structure of the systems and/or apparatus described herein, unless otherwise specified.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in operating a vehicle, said system comprising:
   a transponder configured to be coupled to an engine control system within the vehicle, said transponder further configured to determine coordinates of the vehicle; and
   a central controller positioned remotely from said transponder and configured to communicate with said transponder, said central controller is further configured to:
      receive position messages from said transponder, wherein the position messages include the coordinates of the vehicle as determined by said transponder;
      determine a current route of travel of the vehicle;
      receive terrain data related to the current route;
      calculate a desired energy allocation for use by the engine control system; and
      transmit the desired energy allocation to said transponder, such that the engine control system controls engine function based on the desired energy allocation.

2. A system in accordance with claim 1, wherein said central controller is configured to calculate the desired energy allocation based on the current route and the terrain data.

3. A system in accordance with claim 1, wherein the position messages include an altitude of the vehicle as determined by said transponder, said central controller is further configured to calculate the desired energy allocation based on the current route, the terrain data, and the altitude.

4. A system in accordance with claim 1, wherein said central controller comprises a memory configured to store at least one previous route of travel of the vehicle, said central controller is further configured to determine the current route of travel based on a comparison between coordinates included in the position messages and a comparison to coordinates included in the at least one previous route.

5. A system in accordance with claim 1, wherein said central controller is further configured to:
   receive at least one of weather data and traffic data related to the current route; and
   calculate the desired energy allocation based on the current route, the terrain data, and at least one of the weather data and the traffic data.

6. A system in accordance with claim 1, wherein said central controller is further configured to:
   receive energy usage data from the vehicle; and
   calculate the desired energy allocation based on the current route, the terrain data, and the energy usage data.

7. A system in accordance with claim 1, wherein said central controller is further configured to calculate a desired energy allocation according to a desired allocation of energy used for propulsion by the vehicle and energy generated for storage by the vehicle.

* * * * *